(No Model.) 2 Sheets—Sheet 1.
H. DECK.
LAWN MOWER.
No. 503,904. Patented Aug. 22, 1893.
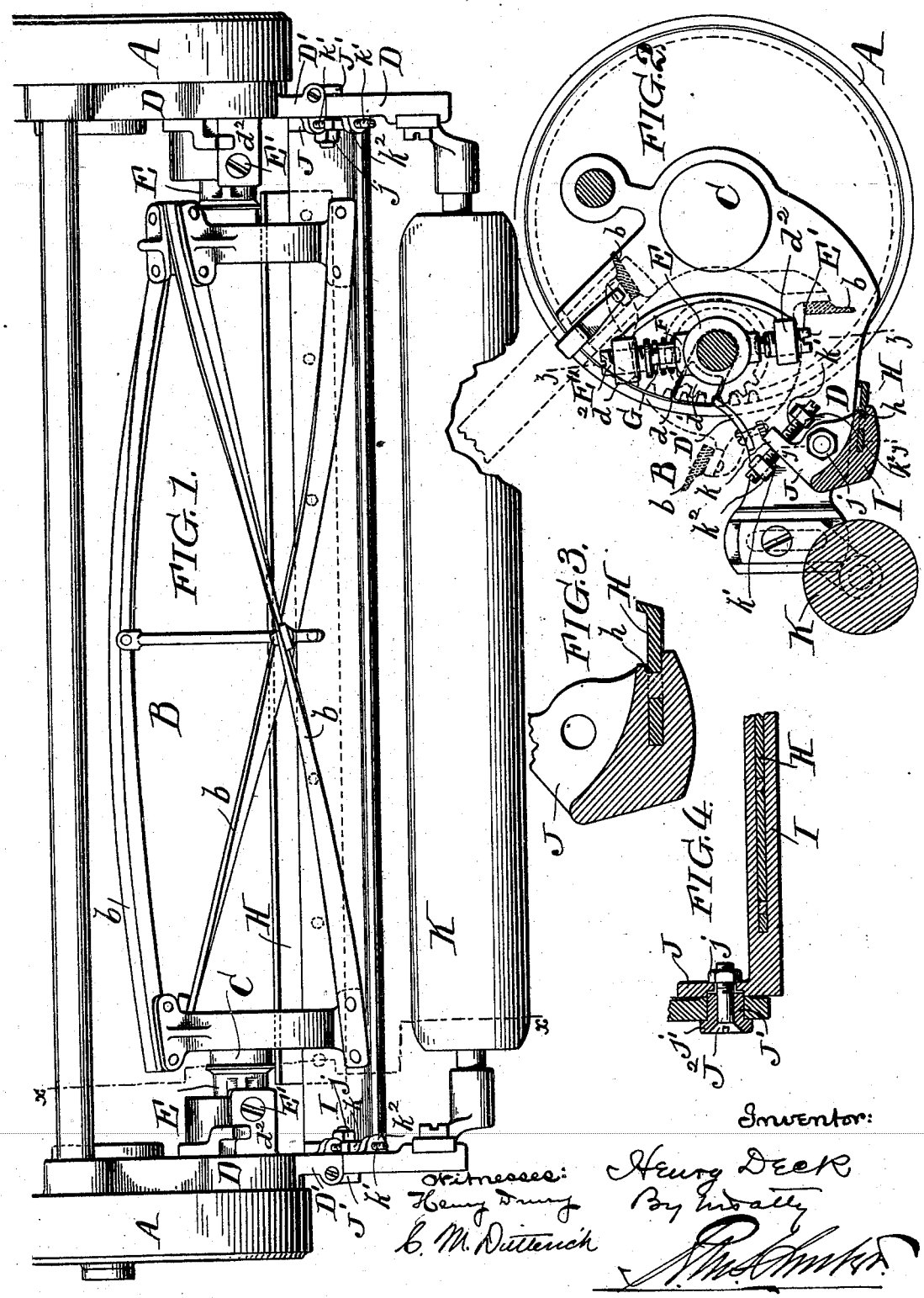

(No Model.) 2 Sheets—Sheet 2.

H. DECK.
LAWN MOWER.

No. 503,904. Patented Aug. 22, 1893.

Witnesses:
Henry Day
Clyde M. Dietrich.

Inventor:
Henry Deck
By his atty

UNITED STATES PATENT OFFICE.

HENRY DECK, OF PHILADELPHIA, PENNSYLVANIA, ASSIGNOR TO JOHN BRAUN, JOHN F. BRAUN, AND WILLIAM P. M. BRAUN, OF SAME PLACE.

LAWN-MOWER.

SPECIFICATION forming part of Letters Patent No. 503,904, dated August 22, 1893.

Application filed August 13, 1892. Serial No. 443,018. (No model.)

*To all whom it may concern:*

Be it known that I, HENRY DECK, of Philadelphia, in the county of Philadelphia and State of Pennsylvania, have invented an Improvement in Lawn-Mowers, of which the following is a specification.

My invention relates to lawn mowers and consists of certain improvements which are fully set forth in the following specification and are shown in the accompanying drawings which form a part thereof.

It is the object of my invention to produce a lawn mower of improved construction.

A part of the features of improvement relates to the manner of supporting the shaft of the rotary cutter blades whereby it may be readily adjusted in position, and permitted to automatically adjust itself to any irregularities or unevenness in the stationary or ledger blade. By this means the blades of the rotary cutter may be caused to make constant contact with the edge of the stationary knife to produce the most effective cutting action, without danger of jamming or undue friction, and the slight friction between the blades produces an automatic sharpening of the cutting edges.

Another portion of the invention relates to the manner of supporting the shaft of the rotary cutter so that it may be easily removed from the machine for purposes of repair.

My invention also includes combinations and arrangements of parts which are hereinafter more fully described and claimed.

Figure 5:
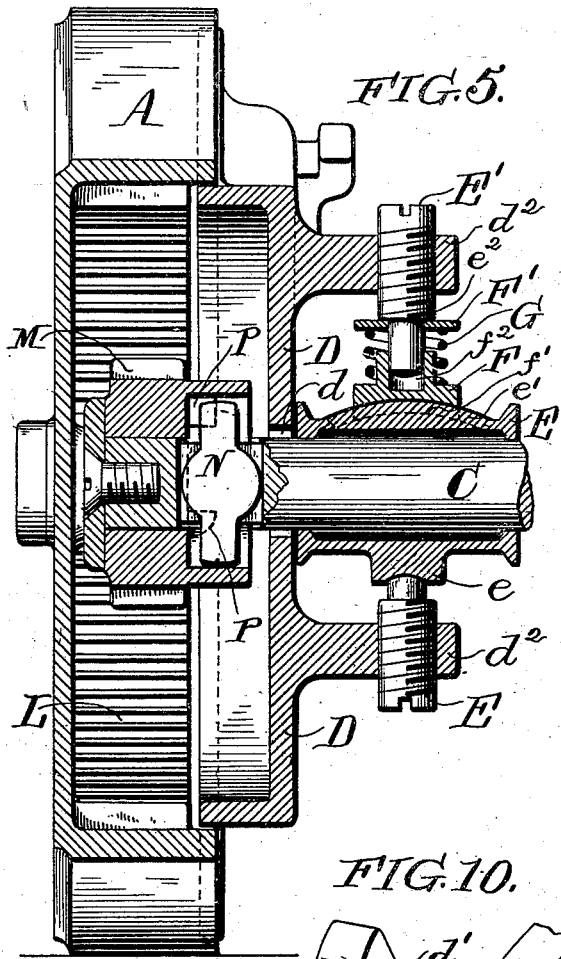
Figures 6, 7:
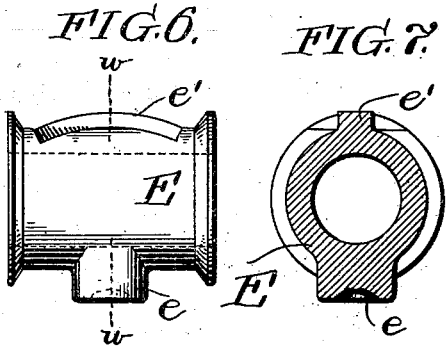
Figure 8:
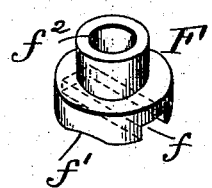
Figures 9, 10:
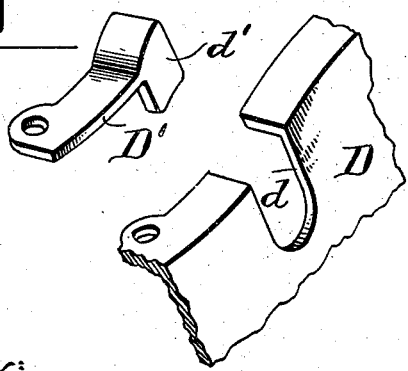

In the drawings: Figure 1 is a plan view of the cutters and operating mechanism of my improved lawn mower. Fig. 2 is a transverse vertical sectional view of the same on the line $x$—$x$ of Fig. 1. Fig. 3 is a transverse vertical sectional view on an enlarged scale of the dead or ledger knife and its supporting bar. Fig. 4 is a longitudinal sectional view of the same on the line $y$—$y$ of Fig. 2 on an enlarged scale. Fig. 5 is a longitudinal vertical sectional view of the supporting and driving devices of the shaft of the rotary cutter on the line $z$—$z$ of Fig. 2 on an enlarged scale. Fig. 6 is a side elevation of one of the detached journal boxes of the shaft of the rotary cutter. Fig. 7 is a transverse vertical sectional view of the same on the line $w$—$w$. Fig. 8 is a perspective view of one of the detached journal box bearings; and Figs. 9 and 10 are detail views in perspective of a portion of one of the side frames and locking devices for the rotary cutter shaft.

A are the wheels of the lawn mower, by the rotation of which the shaft of the rotary cutter is driven.

B is the rotary cutter of the usual construction.

C is the shaft of the rotary cutter.

D are the side frames of the machine by which the cutting mechanism is carried.

H is the stationary cutter or ledger blade.

It is immaterial to my invention in what particular manner the shaft C of the rotary cutter is driven from the wheels A; and any convenient form of power transmitting devices may be employed. For the purpose of illustration, however, I have shown in the drawings driving mechanism, consisting of the internal annular gear L carried on the inner side of the wheels A, and gearing with a pinion M sleeved on the end of the cutter shaft C, the pawl N carried by the shaft C, and the ratchet P on the pinion M, whereby the pinion M drives the shaft C when rotated in one direction, but not in the other.

I shall now describe the features of my invention so far as they relate to the manner of supporting and adjusting the cutter shaft C in the frame of the mover.

The side frames D are provided with open notches $d$ (see Fig. 9), preferably inclined in which the ends of the shaft C are inserted. These notches permit an easy removal of the cutter shaft from the side frames whenever it may be desired for the purpose of making repairs. These notches are preferably larger than the diameter of the shaft so as to permit the shaft to play in them for the purpose of adjustment.

D' are plates adapted to be secured to the side frames D to close the openings in the notches and prevent the passage of grass to the shaft C. The plates D' may be provided with heads or lugs $d'$ adapted to fit down into the notches and effectively close the opening to the shaft. The plate D' may be easily detached when desired so as to permit the removal of the shaft C.

E are journal boxes in which the shaft C is journaled. These boxes are in the form of sleeves placed over the ends of the shaft C and supported by the frame D from lugs $d^2$ by means of adjustable screws E'. The bearing surfaces of the boxes E may be lined with Babbitt metal. The lower portions of the boxes E are provided with recessed lugs $e$ to receive the rounded ends of the lower screws E'. The recesses in the lugs $e$ may be made round so that the box may move on the rounded end of the lower screw E', forming a ball and socket support. The upper portions of the boxes E are supported by the upper screws E', through the intermediate blocks F and the springs G. The boxes E are provided with curved ridges $e'$, which are received in grooves $f$ of the curved under surfaces of the intermediate blocks F, and the ends of the upper screws E' are received in recessed collars $f^2$ of the blocks F. The ends of the screws E' may play slightly up and down in the recessed collars $f^2$ and the springs G are arranged between the blocks F and the screws E'.

F' are washers which may be placed upon the upper screws E' resting on shoulders $e^2$ thereof, to form bearing surfaces for the upper ends of the springs G. Through this construction the cutter shaft C is supported in yielding bearings so that it may move slightly toward or away from the ledger knife and thus automatically adjust itself with reference to the knife. Through the adjusting screws E' which support the journal boxes the shaft C may be positively adjusted with reference to the ledger knife so that the spiral cutting blades $b$ of the rotary cutter B may just make contact with the edge of the ledger blade H, and, the shaft C being free to yield through the springs G, the edges of the rotary cutting blades $b$ may be kept in contact with the stationary or ledger blade H, yielding to any inequalities or unevenness therein. By this means a more perfect cutting action is obtained and the blades are kept sharpened by the friction of their edges. The blades are thus self sharpened.

By the adjustment of the upper screws E', it is apparent that the tension of the springs G may be adjusted to regulate the freedom of the shaft to yield.

The ball and socket support of the lower portion of the boxes E and the upper support through the curved ridges $e'$ and intermediate grooved blocks F permits a slight movement of the boxes E at each end of the shaft C, so that the shaft may more easily adjust itself automatically. This construction will permit one end of the shaft to move to a greater or less extent than the other.

I is the stationary knife bar which carries the ledger blade H. Instead of riveting or screwing the blade H to its supporting bar I, I prefer to cast the supporting bar I upon the steel blade, as shown in Figs. 2, 3, and 4 of the drawings. The blade may be of the usual construction provided with a series of perforations $h$, and when the bar I is cast upon it, the metal flows through the perforations $h$ and the bar I becomes firmly secured to the blade substantially as if made of one piece with it. The bar I is provided with flanges J at its ends by which it may be attached to the side frames D through a bushing J' and bolt $J^2$ and nut $j$. The bushings J' form the bearings for the bar I and permit it to be readily disconnected from the side frames D. The bar I may be adjusted upon its bearings to move the blade H to proper position with reference to the rotary cutter blades $b$ through the projecting arms $k$, which are acted upon by two set screws $k'$ $k'$ carried in lugs $k^2$ $k^2$ of the frame D (see Fig. 2).

The bushings J' have the flanges $j'$ which bear against the outer faces of the side frames D and take the place of the usual washers.

The use of the bushings J' as the bearings for the ends of the bar greatly reduces the wear and permits the bar I to be more easily disconnected.

K is the usual guide roller carried by extensions of the side frames D and located in the rear of the machine behind the stationary or ledger blade H.

The lawn mower may be provided with the usual handle.

While I prefer the minor details of construction shown, I do not mean to limit myself to them, as it is apparent that they may be varied without departing from the invention.

What I claim as new, and desire to secure by Letters Patent, is—

1. In a lawn mower, the combination with the side frames, of a rotary cutter and its shaft, and journal boxes for the ends of the rotary cutter supported by the side frames on the inner sides thereof, the side frames being provided with open notches $d$ wholly independent of the journal boxes to receive the ends of the rotary cutter shaft which project beyond the ends of the journal boxes, whereby the rotary cutter shaft and its journal boxes may be removed together from the side frames.

2. In a lawn mower, the combination with the side frames, of a rotary cutter and its shaft, journal boxes for the ends of the rotary cutter supported by the side frames on the inner sides thereof, the side frames being provided with open notches $d$ wholly independent of the journal boxes to receive the ends of the rotary cutter shaft which project beyond the ends of the journal boxes, whereby the rotary cutter shaft and its journal boxes may be removed together from the side frames, and detachable plates for the side frames to close the notches $d$.

3. In a lawn mower, the combination with the side frames, of a rotary cutter and its shaft, journal boxes for the ends of the rotary cutter supported by the side frames on the inner sides thereof, the side frames being provided with open notches $d$ wholly independent of the journal boxes to receive the ends of the rotary cutter whereby the rotary cutter shaft and its journal boxes may be removed together from the side frames, and detachable plates for the side frames to close the notches $d$ provided with lugs extending down into the notches and partly filling them.

4. In a lawn mower, the combination with the ledger knife, of the rotary cutter having its shaft journaled in automatically yielding bearings whereby the cutter and its shaft may rise automatically.

5. In a lawn mower, the combination of the side frames, the ledger knife, the rotary cutter shaft and cutters, and journal boxes carried by the side frames in yielding supports whereby the cutter and its shaft may yield automatically.

6. In a lawn mower, the combination with the side frames, of the ledger blade, the rotary cutter shaft and its cutters, journal boxes carried by the ends of the cutter shaft and independent of the side frames, and the adjusting supporting screws carried by the side frames and supporting the upper and lower portions of the journal boxes.

7. In a lawn mower, the combination with the side frames, of the ledger blade, the rotary cutter shaft and its cutters, the tubular journal boxes carried by the ends of the cutter shaft and independent of the side frames, the adjusting supporting screws carried by the side frames and supporting the upper and lower portions of the tubular journal boxes, and springs between the journal boxes and upper supporting screws.

8. In a lawn mower, the combination with the rotary cutter shaft, of journal boxes upon the ends of the shaft, a ball and socket support for the lower portions of the journal boxes, and a yielding support for the upper ends of the boxes.

9. In a lawn mower, the combination with the rotary cutter shaft of the journal boxes upon the ends of the shaft, a support for the lower portions of the journal boxes, a supporting pin for the upper portions of the journal boxes, an intermediate block between the supporting pin and upper surface of the journal box movable upon said upper surface, and a spring between the supporting pin and intermediate block.

10. In a lawn mower, the combination with the rotary cutter shaft, of the journal boxes E having the lower recessed lugs $e$ and the upper curved ridges $e'$, the blocks F, having the lower curved grooved surface $f'$ fitting over the curved ridge $e'$ of the boxes, the lower supporting screws E' fitting the recessed lugs $e$, the upper supporting screws E', and the spring G between the upper supporting screws E' and the blocks F.

11. In a lawn mower, the combination with the side frames D having the open notches $d$, of the rotary cutter shaft C received in the notches $d$ and free to play therein, and yielding bearings for the cutter shaft independent of the notches $d$.

12. In a lawn mower, the combination with the side frames D having the open notches $d$, the yielding journal boxes for the ends of the shaft independent of the frames D, and supports for the boxes carried by the side frames.

13. In a lawn mower, the combination with the rotary cutter and its shaft, of the side frames having open notches $d$ extending inwardly from their edges so that the ends of the rotary cutter shaft may be inserted in the side frames or removed therefrom, the open notches being of a size sufficient to permit the ends of the rotary cutter shaft to play vertically, and yielding bearings for the ends of the shaft independent of the notches in the side frames whereby the ends of the shaft when moving with the yielding bearings may rise and fall in the notches $d$.

14. In a lawn mower, the combination with the rotary cutter and its shaft, of the side frames having open notches $d$ extending inwardly from their edges so that the ends of the rotary cutter shaft may be inserted in the side frames or removed therefrom, the open notches being of a size sufficient to permit the ends of the rotary cutter shaft to play vertically, yielding bearings for the ends of the shaft independent of the notches in the side frames whereby the ends of the shaft when moving with the yielding bearings may rise and fall in the notches $d$, and detachable plates D' independent of the yielding bearings carried by the side frames and closing the openings of the notches $d$.

In testimony of which invention I have hereunto set my hand.

HENRY DECK.

Witnesses:
WILLIAM P. M. BRAUN,
ERNEST HOWARD HUNTER.